(12) United States Patent
Hayashi

(10) Patent No.: US 10,685,612 B2
(45) Date of Patent: Jun. 16, 2020

(54) LIQUID CRYSTAL DISPLAY DEVICE AND LIQUID CRYSTAL DISPLAY METHOD

(71) Applicant: Japan Display Inc., Minato-ku (JP)

(72) Inventor: Hirotaka Hayashi, Tokyo (JP)

(73) Assignee: Japan Display Inc., Minato-ku (JP)

( * ) Notice: Subject to any disclaimer, the term of this patent is extended or adjusted under 35 U.S.C. 154(b) by 477 days.

(21) Appl. No.: 15/251,143

(22) Filed: Aug. 30, 2016

(65) Prior Publication Data

US 2017/0069279 A1 Mar. 9, 2017

(30) Foreign Application Priority Data

Sep. 4, 2015 (JP) .................................. 2015-174524

(51) Int. Cl.
*G09G 3/36* (2006.01)
*G02F 1/1343* (2006.01)
(Continued)

(52) U.S. Cl.
CPC ..... *G09G 3/3614* (2013.01); *G02F 1/134309* (2013.01); *G09G 3/2074* (2013.01);
(Continued)

(58) Field of Classification Search
CPC ....................................................... G09G 3/36
See application file for complete search history.

(56) References Cited

U.S. PATENT DOCUMENTS

| 8,368,672 B2 * | 2/2013 | Morita ................. G09G 3/3666 345/100 |
| 8,963,908 B2 * | 2/2015 | Park ...................... G09G 3/001 345/212 |

(Continued)

FOREIGN PATENT DOCUMENTS

| CN | 102270439 A | 12/2011 |
| CN | 103309068 A | 9/2013 |

(Continued)

OTHER PUBLICATIONS

Office Action and Search Report dated Jan. 28, 2019 in the corresponding Chinese Patent Application No. 201610757298.X (with Unedited Computer-Generated English Translation) citing documents AA, AB and AO—AS therein 17 pages.

*Primary Examiner* — Amare Mengistu
*Assistant Examiner* — Shawna T Stepp Jones
(74) *Attorney, Agent, or Firm* — Oblon, McClelland, Maier & Neustadt, L.L.P.

(57) ABSTRACT

According to one embodiment, a liquid crystal display device includes pixel electrodes including unit pixel electrodes, pixel circuits which apply a white-display voltage or a black-display voltage to the unit pixel electrodes, first and second polarity voltage lines being used in applying the white-display voltage and the black-display voltage to the pixel circuits, and a control unit which divides at least polarity voltage lines into a plurality of blocks, and supplies a polarity inversion signal to the polarity voltage lines to be subjected to polarity inversion driving, in units of one block, wherein the pixel circuits each include a pixel switch, a memory, and a polarity select unit which selects a voltage signal on one of the first and second polarity voltage lines in response to a binary image signal held by the memory.

12 Claims, 10 Drawing Sheets

(51) Int. Cl.
*G09G 3/20* (2006.01)
*G02F 1/1335* (2006.01)
*G02F 1/1362* (2006.01)

(52) U.S. Cl.
CPC ..... *G09G 3/3648* (2013.01); *G02F 1/133553* (2013.01); *G02F 2001/134345* (2013.01); *G02F 2001/136218* (2013.01); *G02F 2201/52* (2013.01); *G02F 2203/30* (2013.01); *G09G 2300/0452* (2013.01); *G09G 2300/0861* (2013.01); *G09G 2310/08* (2013.01); *G09G 2330/021* (2013.01)

(56) References Cited

U.S. PATENT DOCUMENTS

| | | |
|---|---|---|
| 2002/0041266 A1 | 4/2002 | Koyama et al. |
| 2002/0075211 A1 | 6/2002 | Nakamura |
| 2010/0134451 A1* | 6/2010 | Cho ............... G09G 3/3677 345/205 |
| 2012/0154262 A1* | 6/2012 | Yamauchi ........ G09G 3/3659 345/100 |
| 2012/0154736 A1 | 6/2012 | Nagasawa et al. |
| 2012/0162594 A1 | 6/2012 | Tamaki et al. |
| 2013/0135269 A1* | 5/2013 | Cummings ........ G02B 26/001 345/208 |
| 2014/0267462 A1* | 9/2014 | Sato ............... G09G 3/2022 345/690 |
| 2014/0285761 A1* | 9/2014 | Tamaki ........... G09G 3/2074 349/144 |
| 2016/0077394 A1 | 3/2016 | Nagasawa et al. |

FOREIGN PATENT DOCUMENTS

| | | |
|---|---|---|
| CN | 103809335 A | 5/2014 |
| CN | 104077966 A | 10/2014 |
| JP | 2001-92954 A | 4/2001 |
| JP | 2012-145925 | 8/2012 |

* cited by examiner

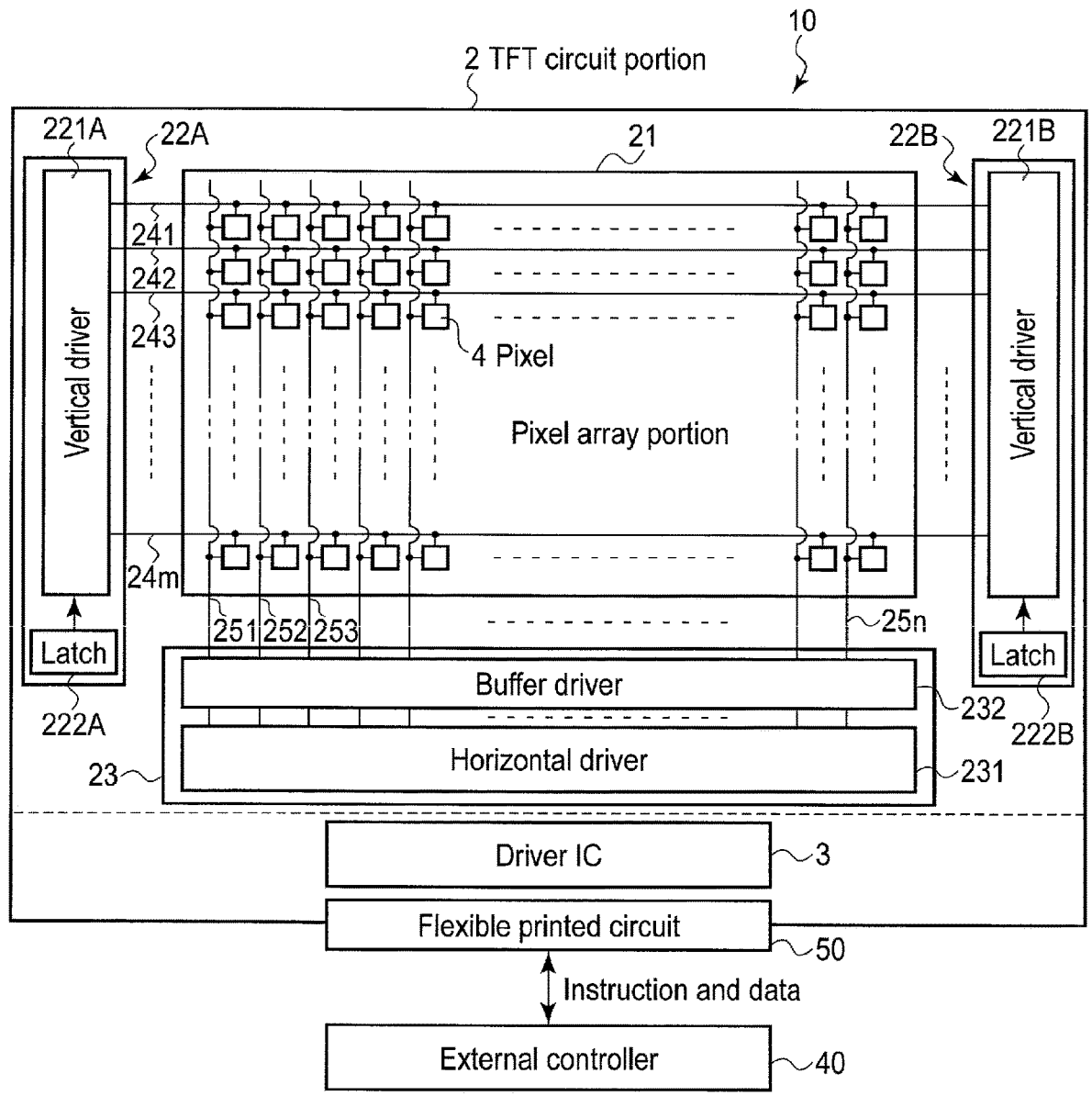
F I G. 1

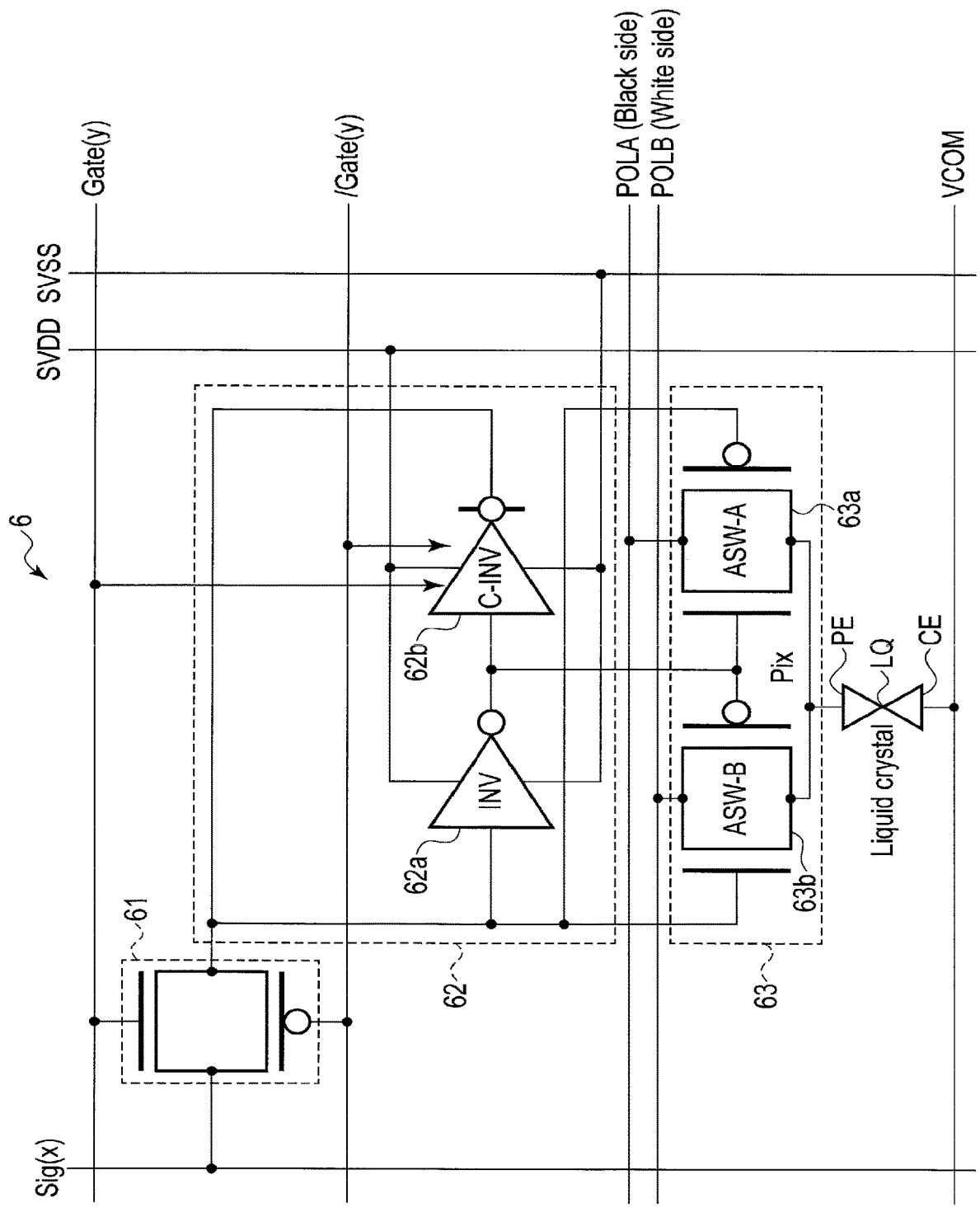
F I G. 3

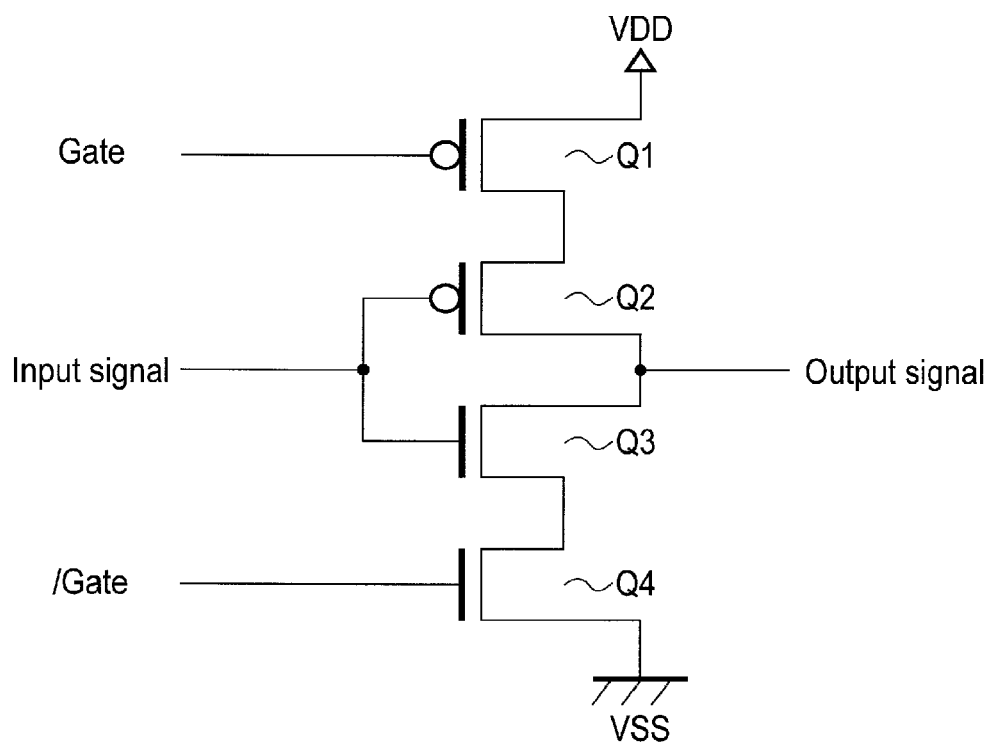
F I G. 4
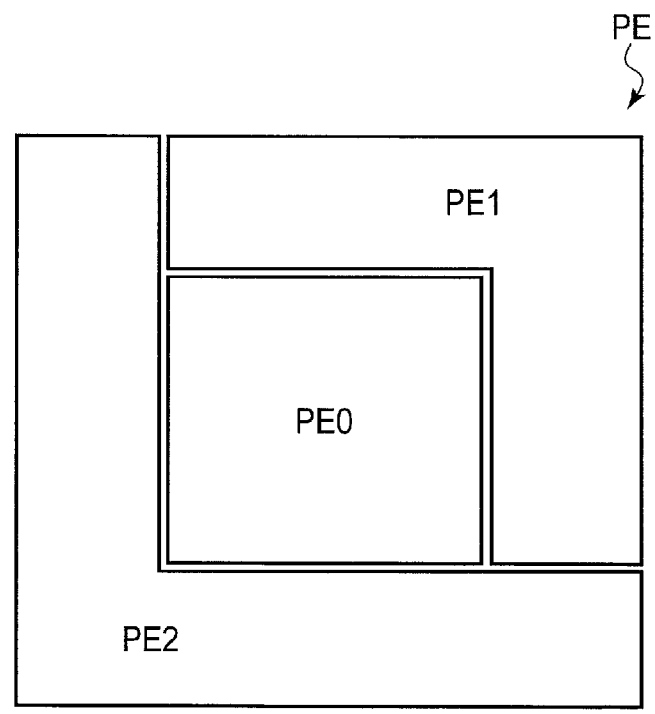
F I G. 5

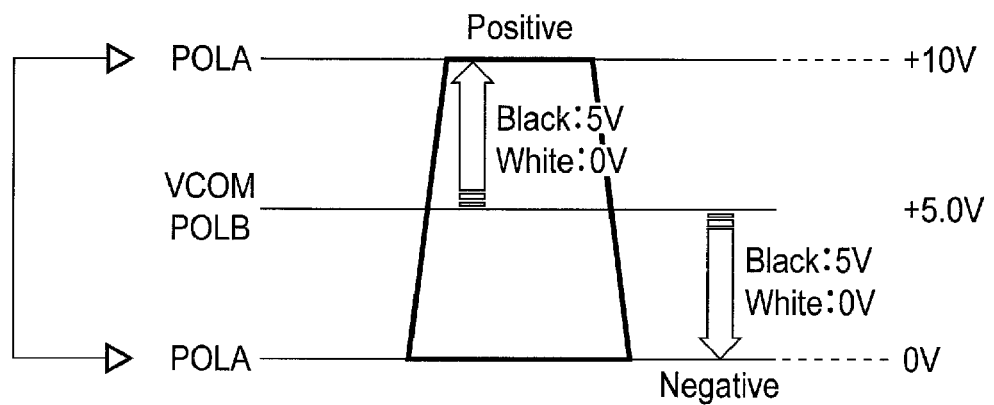
F I G. 9
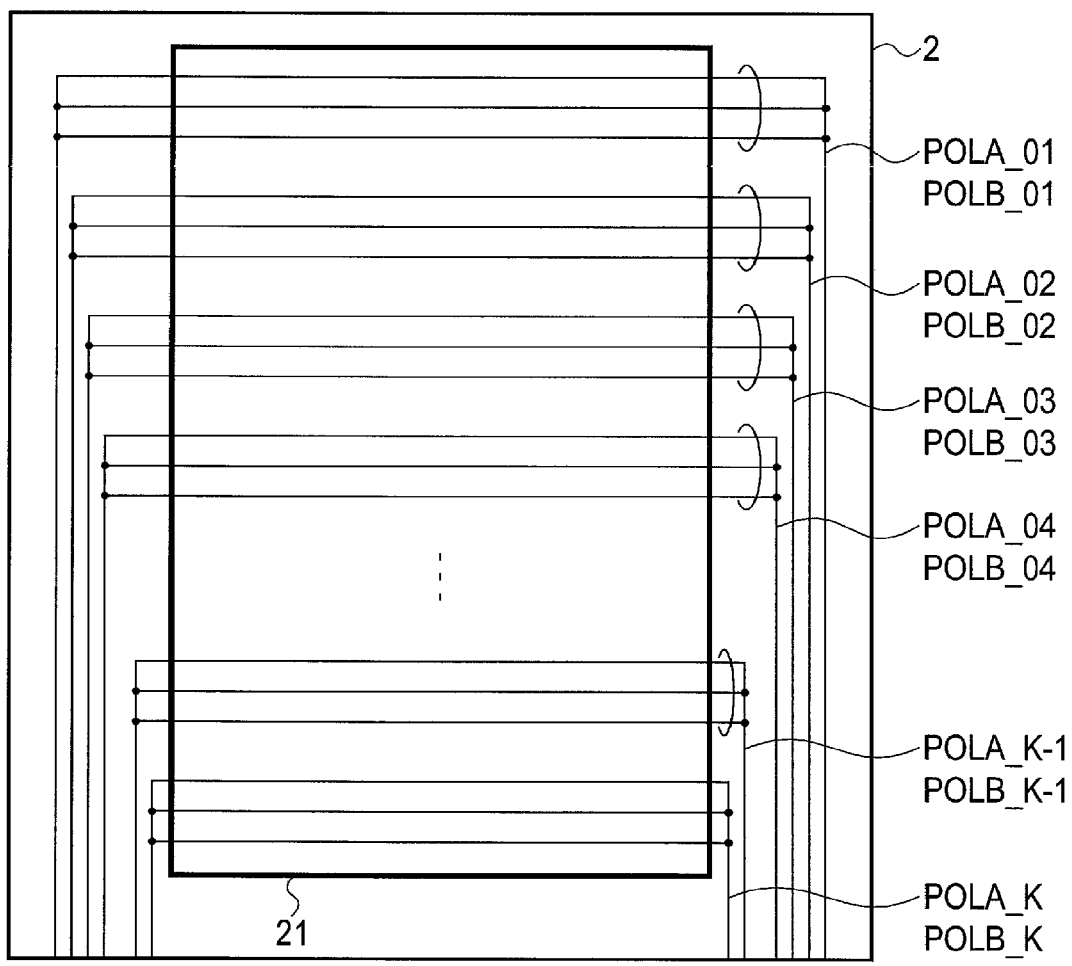
F I G. 10

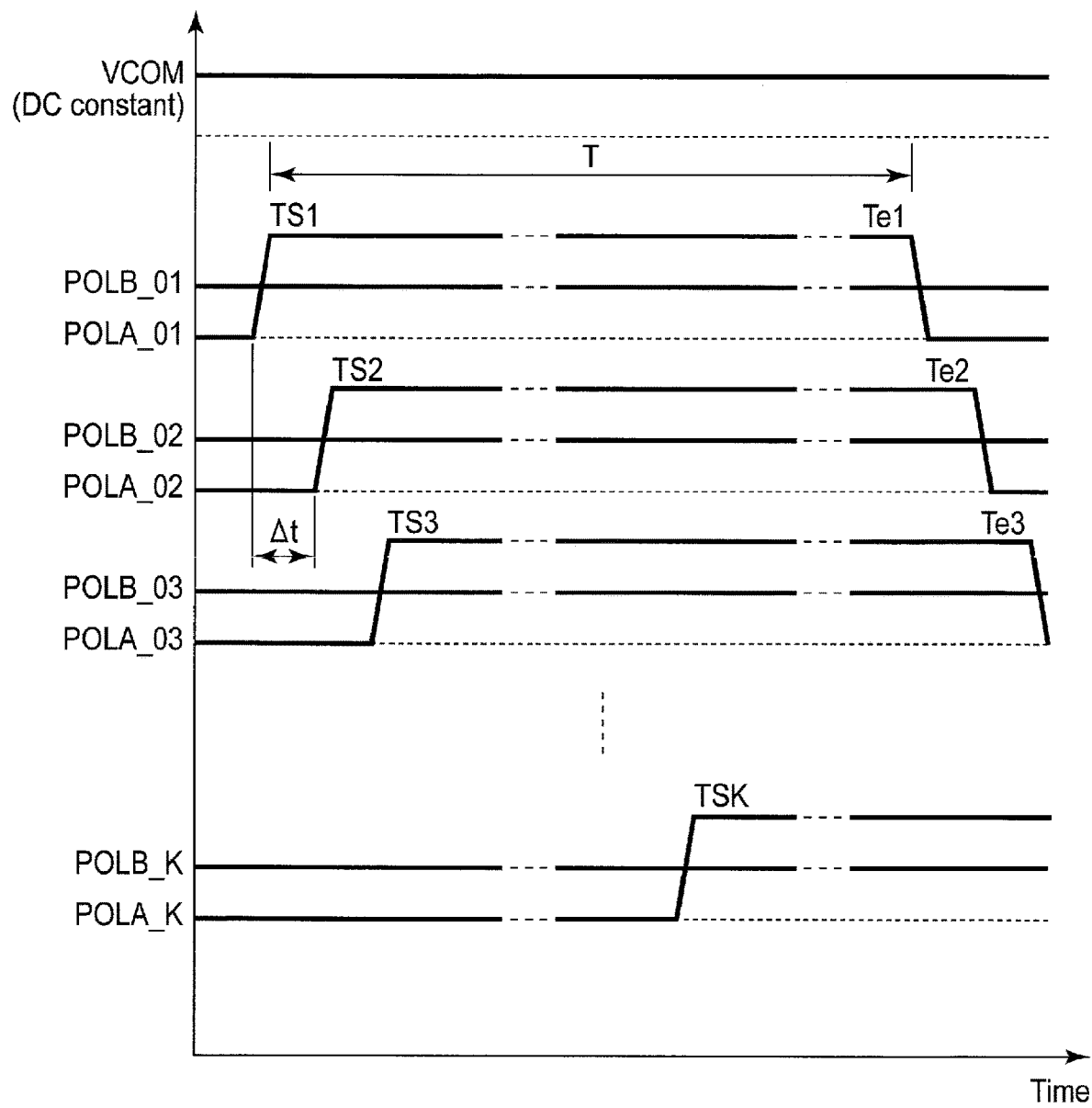
F I G. 11

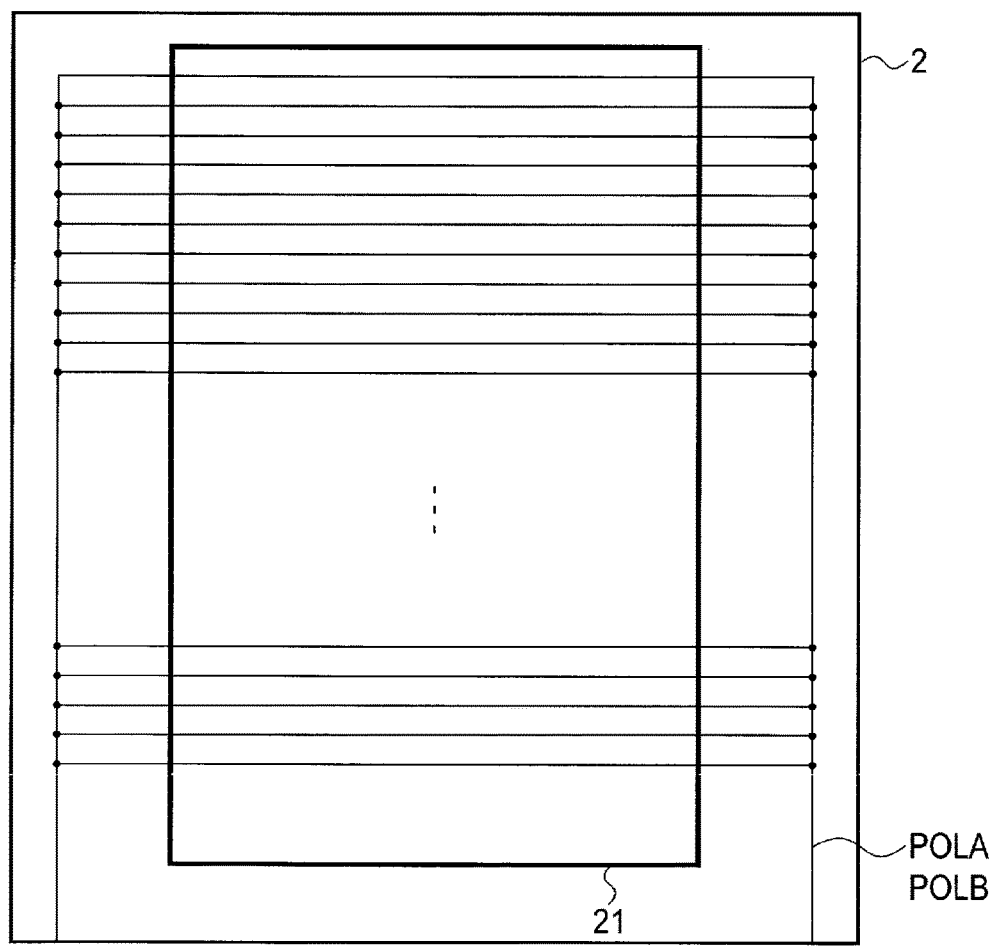
F I G. 12
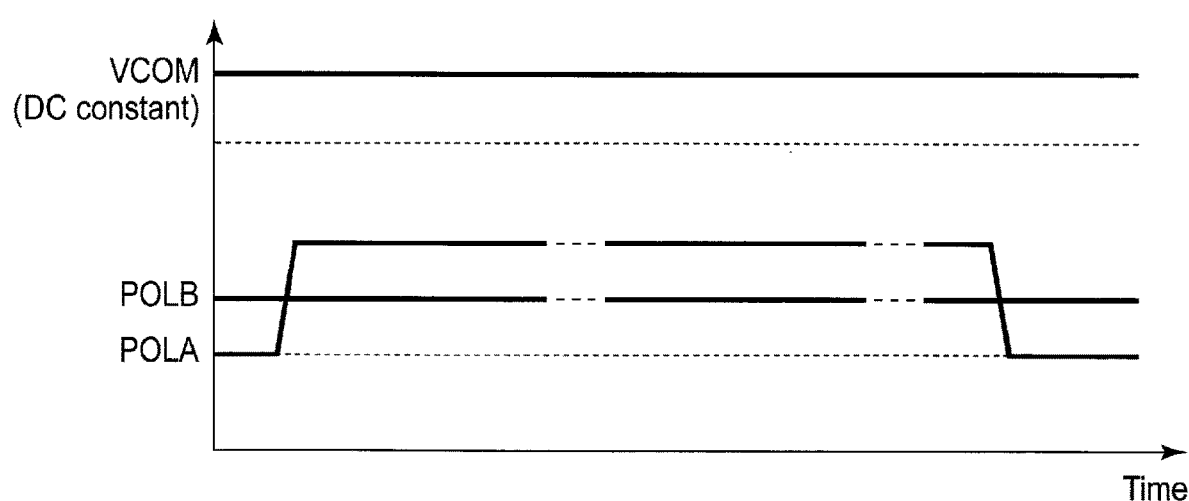
F I G. 13

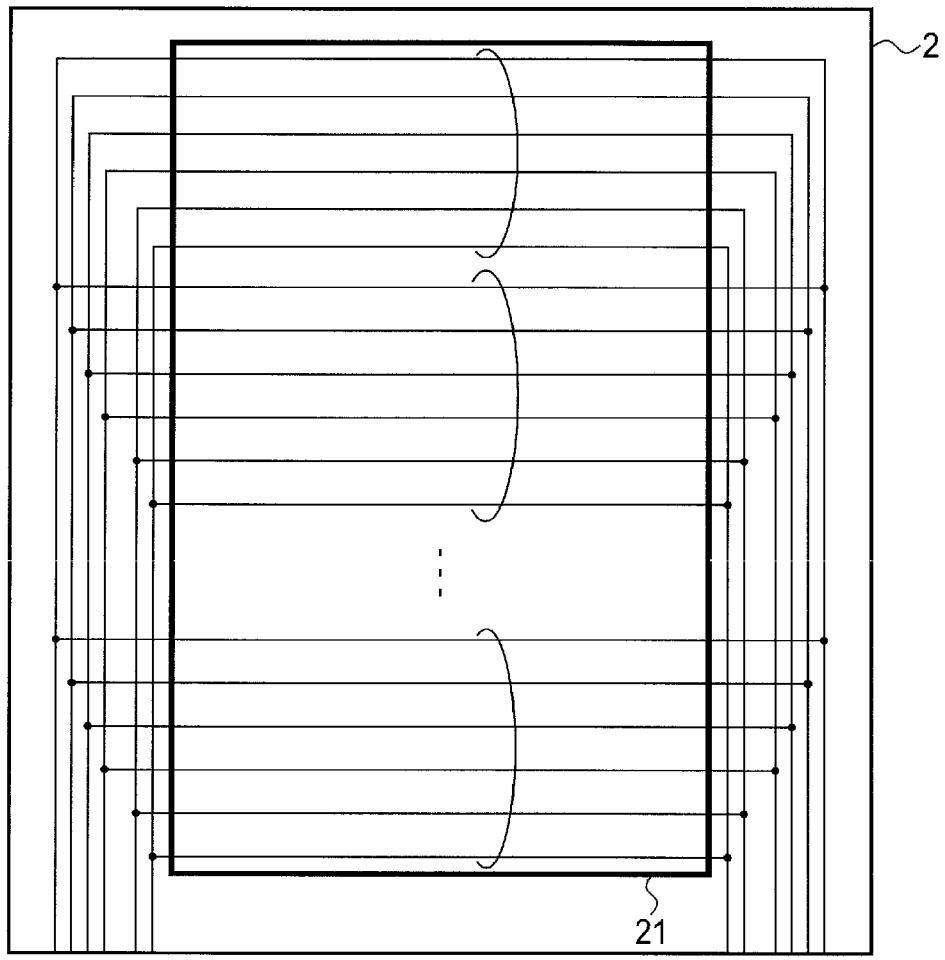
F I G. 14

LIQUID CRYSTAL DISPLAY DEVICE AND LIQUID CRYSTAL DISPLAY METHOD

CROSS-REFERENCE TO RELATED APPLICATIONS

This application is based upon and claims the benefit of priority from Japanese Patent Application No. 2015-174524, filed Sep. 4, 2015, the entire contents of which are incorporated herein by reference.

FIELD

Embodiments described herein relate generally to a liquid crystal display device and a liquid crystal display method.

BACKGROUND

Liquid crystal display devices are thin and light, with low power consumption. By virtue of these features, they are used in various technical fields as displays for televisions and office automation equipment such as personal computers. In recent years, liquid crystal display devices have been used for mobile devices such as cellphones, for vehicle-mounted equipment such as satellite navigation devices, and for tablet computers and signage.

A memory-in-pixel (MIP) liquid crystal display device is known in which pixels include respective memories capable of storing data. In the MIP liquid crystal display device, in the case where an image is displayed using data held in memories, an operation for writing an image signal does not need to be performed in cycles of a frame period, and thus the power consumption can be reduced.

It should be noted that in a liquid crystal display device, for example, when an electric field is applied to a liquid crystal layer, the alignment state of liquid crystal molecules is changed to also change the transmissivity, and an image is thus displayed. However, in the case of adopting a direct-current driving in which the polarity of a voltage to be given is not changed, an electric-field distribution is changed because of the presence of impurity ions in a liquid crystal layer, thus reducing the display quality of an image. Therefore, in general, an alternating-current driving is adopted in which the polarity of the voltage to be applied is inverted at regular intervals.

In the MIP liquid crystal display device, in the case where an image is displayed using data held in memories, as an alternating-current drive scheme, a line-inversion drive scheme is used in which the polarity of a voltage to be applied is changed in units of one horizontal period. However, the MIP liquid crystal display device is also required to further reduce the power consumption.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is an exemplary schematic plan view illustrating a configuration of a liquid crystal display device according to a first embodiment.

FIG. 3 is an exemplary block diagram of a configuration example of a pixel circuit in the liquid crystal display device according to the first embodiment.

FIG. 4 is an exemplary view illustrating a configuration example of a clocked inverter in the pixel circuit in the liquid crystal display device according to the first embodiment.

FIG. 5 is an exemplary view illustrating the configuration of unit pixel electrodes of each of sub-pixels in the liquid crystal display according to the first embodiment.

FIG. 9 is a an exemplary view for explaining an alternating current drive method (inversion drive scheme) of the liquid crystal display device according to the first embodiment.

FIG. 10 is a view for explaining the configuration of polarity voltage lines in the liquid crystal display device according to the first embodiment.

FIG. 11 is an exemplary timing chart for explaining a polarity inversion scheme of the liquid crystal display device according to the first embodiment.

FIG. 12 is an exemplary view illustrating the configuration of polarity voltage lines which was studied before conceiving the liquid crystal display device according to the first embodiment.

FIG. 13 is a timing chart for illustrating a polarity inversion scheme which was studied before conceiving the liquid crystal display device according to the first embodiment.

FIG. 14 is a view for explaining the configuration of polarity voltage lines in a liquid crystal display device according to a second embodiment.

DETAILED DESCRIPTION

Figure 2:
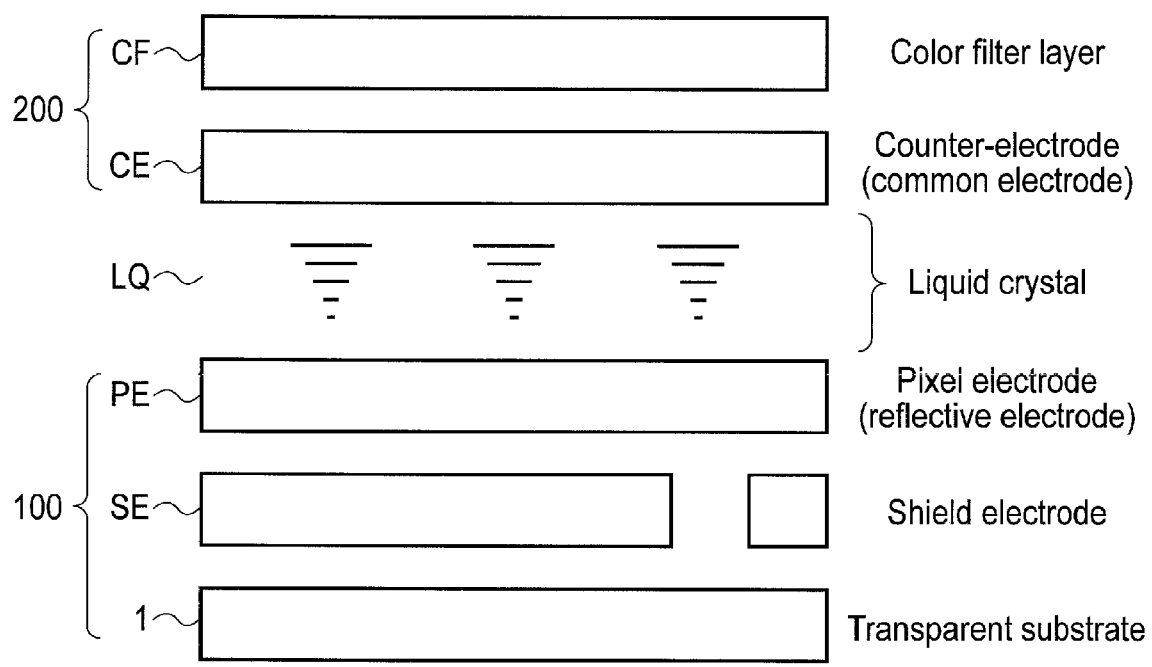
FIG. 2 is an exemplary view illustrating a cross section of a pixel array portion of the liquid crystal display device according to the first embodiment.

Various embodiments will be described hereinafter with reference to the accompanying drawings.

In general, according to one embodiment, a liquid crystal display device includes pixel electrodes arranged in a matrix and each including unit pixel electrodes;

pixel circuits which apply a white-display voltage or a black-display voltage to the unit pixel electrodes, respectively, to cause the unit pixel electrodes to make a display with a gradation according to an area gradation method;

first and second polarity voltage lines arranged parallel to each other and extending along a row in which the pixel electrodes are arranged, the first and second polarity voltage lines being used in applying the white-display voltage and the black-display voltage to the pixel circuits; and a control unit which divides at least polarity voltage lines to be subjected to polarity inversion driving, that are included in the first and second polarity voltage lines, into a plurality of blocks, and supplies a polarity inversion signal to the polarity voltage lines to be subjected to polarity inversion driving, in units of one block, wherein the pixel circuits each include:

a pixel switch which permits a binary image signal to pass through the pixel switch or inhibits the binary image signal from passing through the pixel switch;

a memory which receives the binary image from the pixel switch and holds the binary image signal; and a polarity select unit which selects a voltage signal on one of the first and second polarity voltage lines in response to the binary image signal held by the memory.

The disclosure is a mere example, and arbitrary change of gist which can be easily conceived by a person of ordinary skill in the art naturally falls within the inventive scope. To better clarify the explanations, the drawings may pictorially show width, thickness, shape, etc. of each portion as compared with an actual aspect, but they are mere examples and do not restrict the interpretation of the invention. In the present specification and drawings, after an element or elements are each explained once with reference to a figure in the drawings, elements identical to the explained elements will be denoted by the same reference numbers, respectively, and their explanations will be omitted as appropriate.

First Embodiment

The following explanation is given by referring to by way of example a memory-in-pixel (MIP) reflective-type liquid crystal display device (LCD) in which pixels include respective memories capable of storing data.

The MIP reflective-type liquid crystal display device can display an image in an analog display mode and a memory display mode. In the analog display mode, the gradation of the color displayed by a pixel is varied in an analog fashion. In the memory display mode, since a memory for storing data is provided in a pixel, the gradation of the color displayed by the pixel is digitally varied based on binary data (logic 1 or logic 0) stored in the memory in the pixel.

In the memory display mode, since the data stored in the memory is used, it is not necessary to perform a write operation for writing an image signal, in cycles of a frame period. Thus, in the memory display mode, the power consumption is less than that in the analog display mode, in which a write operation for writing an image signal is performed in cycles of a frame period. Therefore, it is possible to reduce the power consumption of the liquid crystal display device. However, in the memory display mode, since each of pixels makes a display only with a two-step (two-level) gradation based on 1-bit data, for example, an area gradation method is adopted as a gradation display method. The area gradation method is a gradation display method in which for example, a weight of 2:1 is assigned to a pixel area (the area of a pixel electrode), and a display is made with a 4-step gradation based on 2-bit data. The area gradation method will be described later in detail.

FIG. 1 is a schematic plan view of a configuration of a liquid crystal display device according to a first embodiment. As a matter of convenience for explanation, FIG. 1 simply illustrates main portions only.

To be more specific, as illustrated in FIG. 1, an MIP reflective-type liquid crystal display device 10 according to the first embodiment has a module structure in which a TFT circuit portion 2 is formed on a transparent substrate (for example, a glass substrate) 1, and a driver IC 3 is also mounted on the substrate 1 by a chip-on-glass (COG) method. The reflective-type liquid crystal display device 10 having the module structure is given various instructions and data by an external controller (or a CPU or the like) 40 through a flexible printed circuit 50. Based on a signal received by the driver IC 3, the driver IC 3 outputs a drive signal and data to the TFT circuit portion 2.

The TFT circuit portion 2 includes a pixel array portion 21, vertical drive units 22A and 22B and a horizontal drive unit 23. It should be noted that FIG. 1 illustrates function elements of the TFT circuit portion 2 as blocks. The structure of the TFT circuit portion 2 is not limited to the above structure.

In the pixel array portion 21, pixels (memory-in-pixels) 4 are two-dimensionally arranged in a matrix to form a display portion. The pixels 4 incorporate respective memories capable of storing data. A circuit structure of the pixels 4 will be explained later in detail.

In the pixel array portion 21, m rows of pixels 4 and n columns of pixels 4 are arranged; and scanning lines 24 (241 to 24m) extend for the m rows of pixels 4, respectively, in a row direction (a direction in which the pixels 4 of each of the rows are arranged). Both ends of each of the scanning lines 24 (241 to 24m) are connected to associated ones of output terminals of the vertical drive units 22A and 22B, respectively, the output terminals of each of the vertical drive units 22A and 22B are provided for the above rows, respectively. In the pixel array portion 21, in which the m rows of pixels 4 and the n columns of pixels 4 are arranged as described above, signal lines 25 (251 to 25n) extend for the n columns of pixels, respectively, in a column direction (a direction in which the pixels of each of the columns are arranged). One of ends of each of signal lines 25 (251 to 25n) is connected to an associated output terminal of the horizontal drive unit 23.

The vertical drive units 22A and 22B include vertical drivers 221A and 221B, respectively, and also vertical (V) address latches 222A and 222B, respectively. The vertical drivers 221A and 221B can select an arbitrary row of pixels 4 from among the pixels 4 provided in the pixel array portion 21. The V address latches 222A and 222B store address data on a row address given from the driver IC 3, i.e., data on an address determined with respect to a vertical (V) direction.

The vertical drivers 221A and 221B include, for example, decoders. The vertical drivers 221A and 221B decode the address data stored in the V address latches 222A and 222B, and output scanning signals to a row of pixels 4 specified by the decoded address data. Upon reception of the scanning signals, the row of pixels 4 enters an operating state.

Because of provision of the decoders, the vertical drivers 221A and 221B can select an arbitrary row of pixels 4, that is, they can specify an address. By virtue of this feature, in the case of rewriting of data of the pixels 4 in the pixel array portion 21, it is possible to rewrite not only data of pixels 4 corresponding to a single screen image, but data of pixels 4 corresponding to a specific area, i.e., a row of pixels 4 the address of which is specified.

It should be noted that in the first embodiment, the vertical drive units 22A and 22B are provided on left and right sides with respect to the pixel array portion 21; however, this structure is a mere example. That is, the vertical drive units 22A and 22B can be provided on only one of the left and right sides with respect to the pixel array portion 21. However, in order to reduce a propagation delay of scanning signals output from the vertical drive units 22A and 22B to the minimum, it is more preferable that the vertical drive units 22A and 22B be arranged on the left and right sides with respect to the pixel array portion 21 than in the case where they are arranged on only one of the left and right sides with respect to the pixel array portion 21.

As illustrated in FIG. 1, the horizontal drive unit 23 comprises a horizontal driver 231 and a buffer circuit 232.

The horizontal drive unit 23 writes pixel data to a column of pixels 4 selected by the vertical drive units 22A and 22B. As a method in which the horizontal drive unit 23 writes pixel data, various methods can be applied, such as a line-sequential system in which the horizontal drive unit 23 writes pixel data to a selected row of pixels 4 at a time and a dot-sequential system in which the horizontal drive unit 23 writes pixel data to a selected row of pixels successively in units of one pixel.

The driver IC 3, as described above, is mounted by the COG method on the transparent substrate 1 on which the TFT circuit portion 2 is formed. The driver IC 3 is given data and an instruction from the external controller 40 through, for example, the flexible printed circuit 50. The data is data (image data/pixel data) for rewriting data held in each of the memories provided in the pixels 4 in the pixel array portion 21. The instruction is an instruction to instruct data of the pixels 4 in the pixel array portion 21 to be rewritten. The instruction includes information on the timing and information on an area at which rewriting of the data is to be started. To be more specific, it includes, for example, area information on an area to be subjected to rewriting of the data, i.e., information on an XY start address and an XY end address, a rewrite instruction to rewrite the data, etc.

It should be noted that the data for rewriting the data and the instruction to rewrite the data (for example, a screen-image refresh command) are sent in this order in time sequence from the external controller 40 to the driver IC 3.

The driver IC 3 separates the data and instruction sent from the external controller 40 from each other, and produces various timing signals. Then, based on the timing signals, the data is output to the TFT circuit portion 2; to be more specific, it is output to the horizontal driver 23 in the TFT circuit portion 2. The driver IC 3 extracts from the instruction, the information on the XY start address and XY end address of the area to be subjected to rewriting of the data. Furthermore, based on the various timing signals, the driver IC 3 outputs drive signals for driving the vertical drive units 22A and 22B and the horizontal driver 23 to the TFT circuit portion 2.

FIG. 2 is a cross-sectional view of the pixel array portion 21 in the liquid crystal display device according to the first embodiment. The liquid crystal display device 10 comprises an array substrate 100, a counter-substrate 200 and a liquid crystal LQ held between these substrates.

In the counter-substrate 200, a color filter layer CF and a counter-electrode CE are provided. The color filter layer CF includes colored layers which are arranged in association with sub-pixels included in the pixels, and which are colored red (R), green (G), blue (B) and white (W). The counter-electrode CE is one of electrodes for causing a voltage to be applied to the liquid crystal LQ. The counter-electrode CE is electrically connected to a common voltage line VCOM for applying a constant potential.

The array substrate 100 comprises the transparent substrate 1, shield electrodes SE and pixel electrodes PE. The pixel electrodes PE are the others of the electrodes for causing a voltage to be applied to the liquid crystal LQ. The pixel electrodes PE function as reflective electrodes, and metal such as silver (Ag) or aluminum (Al), which reflects light, is provided on surfaces of the pixel electrodes PE, which face the liquid crystal LQ. On the transparent substrate 1, the driver IC 3 and pixel circuits to be described later are provided. The pixel circuits and the pixel electrodes PE are electrically connected to each other through contact holes formed in the shield electrodes SE. It should be noted that in the case of making a color display, it is preferable that sliver (Ag) be provided on the surfaces of the pixel electrodes PE which face the liquid crystal LQ, to raise the reflectivity.

As described above, according to the first embodiment, each of the pixels comprises four sub-pixels which are colored red (R), green (G), blue (B) and an achromatic color (W). Therefore, as illustrated in FIG. 2, each of the sub-pixels includes a color filter CF provided with any of layers colored red, green, blue and an achromatic color, and further includes a counter-electrode CE, a liquid crystal LQ, a pixel electrode PE, a shield electrode SE and a transparent substrate 1.

Then, the pixel circuits 6 of the liquid crystal display device according to the first embodiment will be described. The liquid crystal display device 10 according to the first embodiment adopts the area gradation method in order that a multi-bit color display be achieved using memories. The area gradation method is a method for making a color display with a gradation according with the size of a halftone dot. Thus, a pixel electrode of each sub-pixel, which is a display area, is divided into a plurality of unit pixel electrodes to which weights are assigned, and a selected unit pixel electrode or unit pixel electrodes make a color display with a gradation to be applied. The area gradation method will be concretely described later in detail.

FIG. 3 is a block diagram of a configuration example of a pixel circuit 6 in the liquid crystal display device according to the first embodiment. In the liquid crystal display device according to the first embodiment, pixel circuits 6 are provided for unit pixel electrodes, respectively. Therefore, a single sub-pixel comprises a plurality of pixel circuits 6. In the following, the scanning lines 24 are referred to as scanning lines Gate (y) and/Gate (y). The phase of a signal to be supplied to a scanning line Gate (y) is opposite to that of a signal to a scanning line/Gate (y). Also, in the following, the signal lines 25 are referred to as signal lines Sig (x).

A pixel circuit 6 comprises a pixel switch 61, a memory 62 and a polarity select switch 63. The pixel switch 61 fetches a binary (white or black) signal from a signal line Sig (x) at a predetermined timing, and outputs it to the memory 62. The binary signal is a signal for causing a liquid crystal to make a white display or a black display. The memory 62 holds the fetched binary signal, and outputs it to the polarity select switch 63. The polarity select switch 63 is connected to polarity voltage lines POLA and POLB for applying a white voltage or a block voltage to a unit pixel electrode of a sub-pixel electrode PE of the liquid crystal LQ, the white voltage being a voltage for causing the liquid crystal to make a white display, the black voltage being a voltage for causing the liquid crystal to display a black display. In accordance with the binary signal from the memory 62, the polarity select switch 63 selects a voltage signal on the polarity voltage line POLA or a voltage signal on the polarity voltage line POLE, and outputs the selected voltage signal to the unit pixel electrode of the sub-pixel electrode PE. Thereby, the liquid crystal LQ is caused to make the white display or the black display in response to the binary (white or black) signal from the signal line Sig (x). The polarity select switch 63 functions as a polarity select unit.

Then, the structure of the pixel circuit 6 will be explained in detail.

The pixel switch 61 is formed of a transfer gate in which an n-channel transistor and a p-channel transistor are connected in parallel with each other. An input terminal of the pixel switch 61 is electrically connected to the signal line Sig (x), and an output terminal of the pixel switch 61 is electrically connected to an input terminal of the memory 62. Furthermore, the gate of the n-channel transistor is electrically connected to the scanning line Gate (y), and the gate of the p-channel transistor is electrically connected to the scanning line/Gate (y). It should be noted that the phase of a signal on the scanning line Gate (y) is opposite to that of a signal on the scanning line/Gate (y). Since the pixel switch 61 is formed of the transfer gate, it is possible to output the binary (white or black) signal from the signal line Sig (x) to the memory 62 without reducing the voltage of the binary signal.

The memory 62 comprises inverter (INV) 62a and clocked inverter (C-INV) 62b. An output signal from inverter 62a is input to clocked inverter 62b, and an output signal from clocked inverter 62b is fed back to inverter 62a. In such a manner, a feedback circuit is provided, as a result of which a signal input to inverter (INV) 62a is held (stored in a memory). It should be noted that as a clock signal for controlling an invert operation of clocked inverter 62b, each of the signal on the scanning line Gate (y) and the signal on the scanning line/Gate (y) is used.

The polarity select switch 63 comprises analog switch (ASW-A) 63a and analog switch (ASW-B) 63b. An input terminal of analog switch 63a is connected to a polarity voltage line POLA for applying a voltage for causing the liquid crystal LQ to make a black display. An input terminal of analog switch 63b is connected to a polarity voltage line POLB for applying a voltage for causing the liquid crystal LQ to make a white display. Furthermore, an output terminal of analog switch 63a and an output terminal of analog switch 63b are connected to the unit pixel electrode of the sub-pixel electrode PE.

In analog switches 63a and 63b, n-channel and p-channel transistors are connected symmetrically. Furthermore, to the gate of the n-channel transistor of analog switch 63a and the gate of p-channel transistor of analog switch 63b, the output signal from inverter 62a is input. To the gate of the p-channel transistor of analog switch 63a and the gate of the n-channel transistor of analog switch 63b, the output signal from clocked inverter 62b is input. Therefore, the output signal from the memory 62 (the output signal from inverter 62a and the output signal from clocked inverter 62b) controls switching between on and off states of analog switches 63a and 63b.

The operation of the pixel circuit 6 will be explained in detail with reference to FIG. 3.

The horizontal driver 231 outputs a white voltage (10V) or a black voltage (0V) to a signal line Sig (x). When the vertical drivers 221A and 221B apply a high voltage to the scanning line Gate (y), the pixel switch 61 is made to allow a signal to pass through, and a voltage on the signal line Sig (x) is output to the memory 62.

The signal input to the memory 62 is inverted by inverter 62a, and then input to clocked inverter 62b. Clocked inverter 62b performs an inverter operation only when the scanning line Gate (y) is at a low voltage. Therefore, after the voltage of the scanning line Gate (y) becomes high, and the voltage of the signal line Sig (x), which is the output voltage from the pixel switch 61, is inverted by inverter 62a, and output to clocked inverter 62b, when the voltage of the scanning line Gate (y) becomes low, the output of clocked inverter 62b (which is a voltage having the same phase as the voltage of signal line Sig (x)) is input to inverter 62a. As a result, a loop circuit is provided by these inverters, and the voltage of the signal line Sig (x) and a voltage the phase of which is opposite to that on signal line Sig (x) are held.

In the polarity select switch 63, in the case where the voltage of the signal line Sig (x) is a white voltage (10V), analog switch 63b is turned on, and from the polarity voltage line POLB, a voltage for causing the liquid crystal LQ to make a white display is applied to the unit pixel electrode of the sub-pixel electrode PE. In the case where the voltage of the signal line Sig (x) is a black voltage (0V), analog switch 63a is turned on, and from the polarity voltage line POLA, a voltage for causing the liquid crystal LQ to make a black display is applied to the unit pixel electrode of the sub-pixel electrode PE.

FIG. 4 is a view showing a configuration example of a clocked inverter in a pixel circuit 6 in the liquid crystal display device according to the first embodiment.

Clocked inverter 62b comprises p-channel transistors Q1 and Q2 and n-channel transistors Q3 and Q4. Transistors Q1, Q2, Q3 and Q4 are connected in series in this order. The drain of transistor Q1 is electrically connected to a high voltage line VDD, and the drain of transistor Q4 is electrically connected to a low voltage line VSS. The gates of transistors Q2 and Q3 are connected to input signal lines, and the sources of transistors Q2 and Q3 are connected to output signal lines. Furthermore, the gate of transistor Q1 is connected to the scanning line Gate (y), and the gate of transistor Q4 is connected to the scanning line/Gate (y).

In such a manner, clocked inverter 62b, which has two channels and is driven using two clock signal lines, is applied to the memory 62, whereby the scanning line Gate (y) and scanning line/Gate (y) can be used as clock signal lines. If such two clock signal lines are not used, and one channel-type clocked inverter which is driven using one clock signal line is applied, the voltage of a clock signal on the clock signal line needs to be higher than voltages of signals input to and output from the inverter. Therefore, in this case, it is necessary to provide another clock signal line for applying a higher voltage than the input voltage. In the first embodiment, the memory 62 can be formed without the need to further provide a new power supply circuit.

Next, the area gradation method applied to the first embodiment will be explained.

FIG. 5 is a view illustrating the configuration of the unit pixel electrodes of each of the sub-pixels in the liquid crystal display device according to the first embodiment.

The area gradation method is a gradation display method of making a display with a $2^N$-step gradation using N unit pixel electrodes having area ratios of $2^0, 2^1, 2^2, \ldots, 2^{N-1}$. A sub-pixel electrode PE of a pixel 4, which is illustrated in FIG. 5, is divided into three unit pixel electrodes PE0, PE1 and PE2 to which weights are assigned in accordance with their areas. The area ratio between the unit pixel electrodes PE0, PE1 and PE2 is 1:2:4. Therefore, a gradation can be expressed in the size of a halftone dot which is any or any combination of the unit pixel electrodes PE0, PE1 and PE2; that is, a color display can be made with a gradation represented by 3 bits, i.e., an 8-gradation ($8=2^3$).

Figure 6:
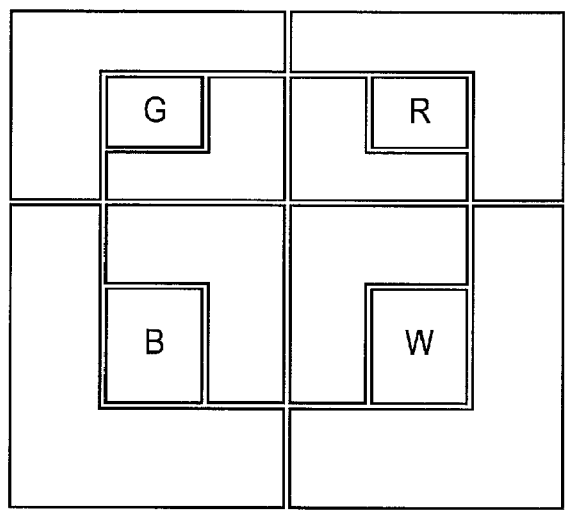
FIG. 6 is an exemplary view illustrating the arrangement of sub-pixels in each of pixels and the configuration of unit pixel electrodes of the sub-pixels in the liquid crystal display according to the first embodiment.

FIG. 6 is a view illustrating the arrangement of sub-pixels of each of pixels and the configuration of unit pixel electrodes of the sub-pixels in the liquid crystal display device according to the first embodiment.

The pixel illustrated in FIG. 6 is square (SQ) variant pixel. Roughly speaking, a green (G) sub-pixel, a red (R) sub-pixel, a blue (B) sub-pixel and an achromatic-color (W) sub-pixel are arranged on the left upper side, the right upper side, the left lower side and the right lower side, respectively. The unit pixel electrodes of the sub-pixels are arranged such that as illustrated in FIG. 6, the unit pixel electrodes are symmetric with respect to a boundary line which divides a pixel into two parts (two groups of sub-pixels), and are not symmetric with respect to another boundary line, i.e., a boundary line crossing the former boundary line. However, the pixel of the embodiments is not limited to the SQ variant pixel. Square pixels which is called WhiteMagic (trademark) in which R, G, B and W sub-pixels have the same size may be used. If square sub-pixels which are R, G, B and W sub-pixels have the same size are applied, an achromatic color (W) can be applied in place of part of R, G and B, and as a result, the luminance can be improved.

Figure 7:
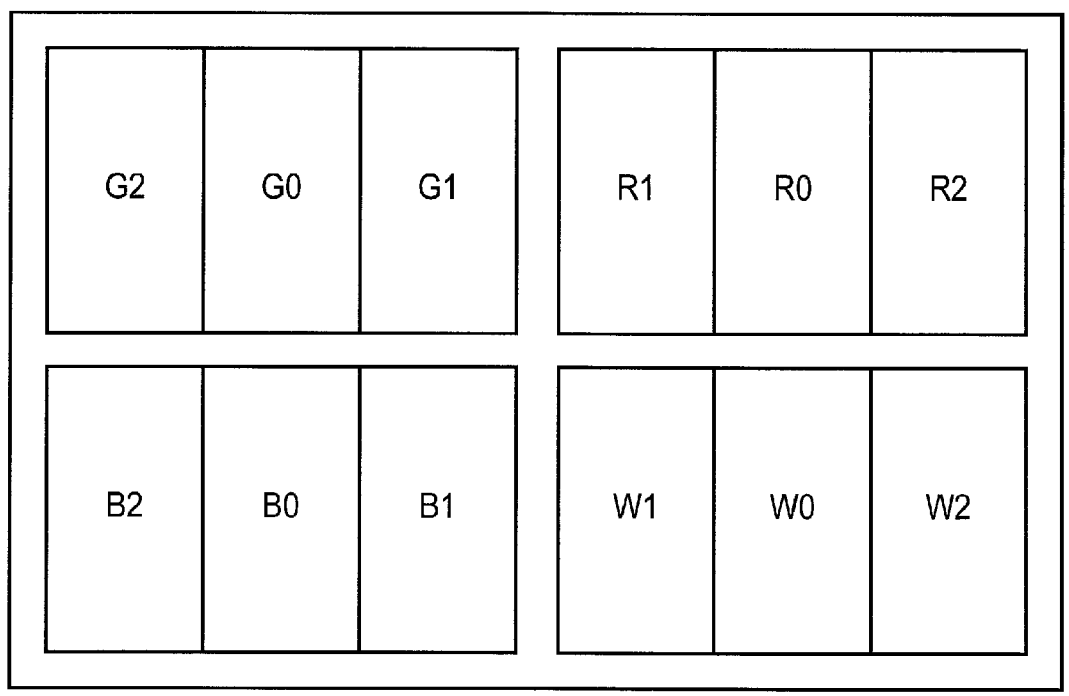
FIG. 7 is an exemplary view illustrating the arrangement of pixel circuits in the liquid crystal display device according to the first embodiment.

FIG. 7 is a view illustrating the arrangement of pixel circuits in the liquid crystal display device according to the first embodiment.

The pixel circuits are arranged on the transparent substrate 1 in positions which correspond to areas where the sub-pixels as illustrated in FIG. 6 are located. For example, in pixel circuits for green (G) which are located on the left upper side, pixel circuits G2, G0 and G1 are arranged in positions corresponding to the positions of the unit pixel electrodes PE2, PE0 and PE1. Output signals of the pixel circuits G0, G1 and G2 are supplied to the unit pixel electrodes PE0, PE1 and PE2 through the contact holes in the shield electrodes SE. The same is true of pixel circuits for red (R), pixel circuits for blue (B) and pixel circuits for an achromatic color (W).

Figure 8:
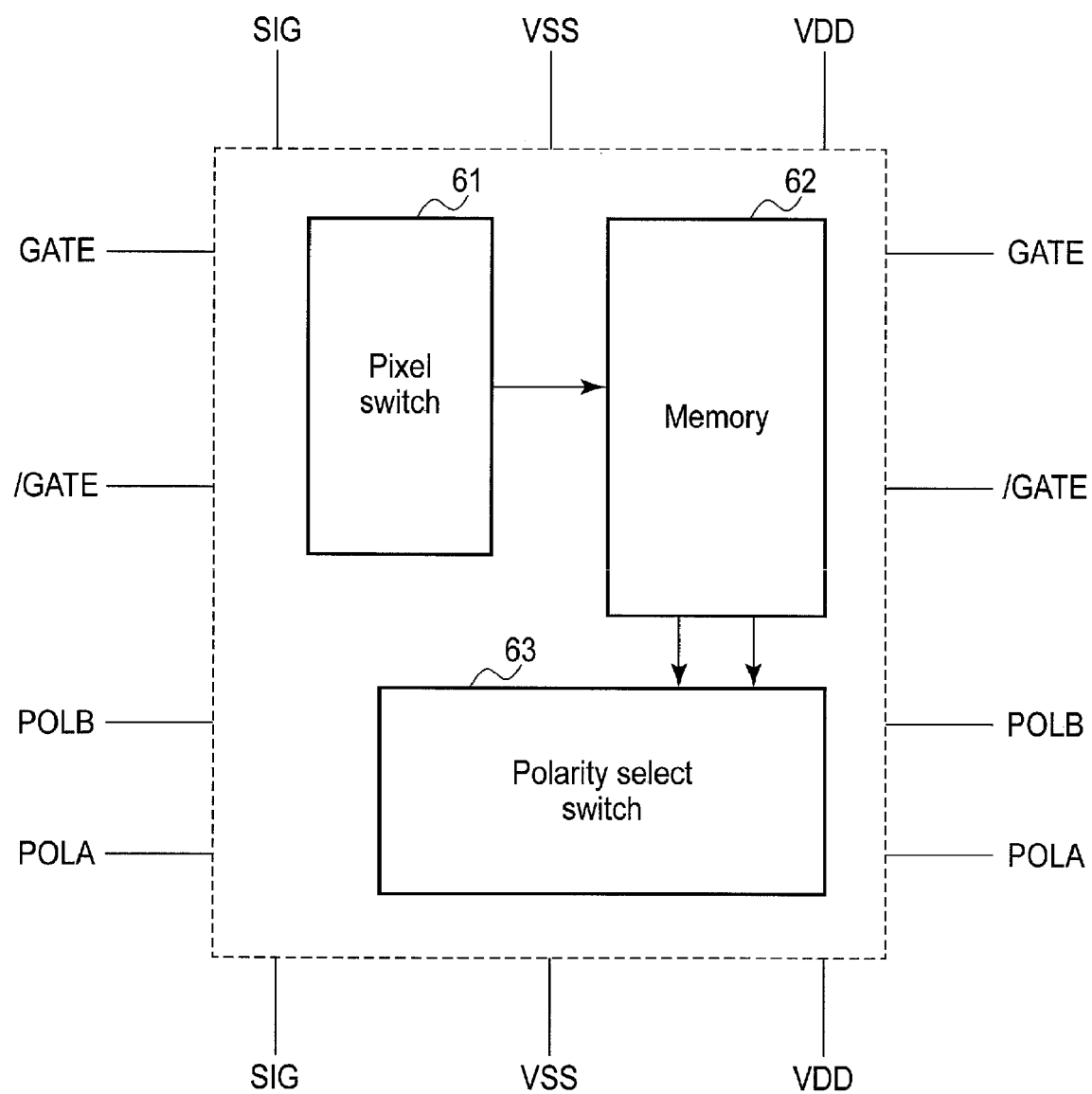
FIG. 8 is an exemplary view illustrating the arrangement of elements mounted on each of the pixel circuits in the liquid crystal display device according to the first embodiment.

FIG. 8 is a view illustrating the arrangement of elements mounted on each of the pixel circuits in the liquid crystal display device according to the first embodiment.

Referring to FIG. 8, in upper part of a pixel circuit area illustrated in FIG. 8, the pixel switch 61 and the memory 62 are mounted side by side laterally, and in lower part of the pixel circuit area, the polarity select switch 63 is mounted. Furthermore, the scanning lines Gate (y) and/Gate (y) extend in the row direction, with the pixel switch 61 and the memory 62 interposed between these scanning lines. Also, the polarity voltage lines POLA and POLB extend in the row direction, with the polarity select switch 63 interposed between these voltage lines. Furthermore, for each pixel circuit, the signal line Sig (x), the high-voltage line VDD and the low-voltage line VSS extend in the column direction.

FIG. 9 is a view for explaining an alternating current drive scheme (inversion drive scheme) of the liquid crystal display device according to the first embodiment. FIG. 9 illustrates an example of a liquid crystal (5-V liquid crystal) in which the difference (range) between a white-display voltage and a black-display voltage is 5V, and which is in a normally-white mode.

In the 5-V liquid crystal, a constant voltage of 5V is applied to a counter-electrode CE through a common voltage line VCOM. Therefore, the voltage of a polarity voltage line POLB, which causes the liquid crystal LQ to make a white display, is 5V. The voltage of a polarity voltage line POLA, which causes the liquid crystal LQ to make a white display, is 0V or 10V. Thus, in the alternating current drive scheme (inversion drive scheme), the voltage of the polarity voltage line POLB is set at a constant voltage of 5V, and the voltage of the polarity voltage line POLA is changed alternately between 0 and 10V. By such a drive scheme, the polarity of the liquid crystal can be inverted.

FIG. 10 is a view for explaining the configuration of polarity voltage lines in the liquid crystal display device according to the first embodiment.

As illustrated in FIG. 10, polarity voltage lines POLA and POLB are divided into blocks consisting of polarity voltage lines successively arranged in the column direction. For example, they are divided into K blocks: a block of polarity voltage lines POLA_01 and POLB_01; a block of polarity voltage lines POLA_02 and POLB_02; . . . ; and a block of polarity voltage lines POLA_k and POLB_k. It should be noted that in the example illustrated in FIG. 10, the number of polarity voltage lines POLA and POLB included in each of the blocks is three; however, it is not limited to three. Also, the blocks do not always need to include the same number of polarity voltage lines. Thus, the number of polarity voltage lines may vary from one block to another. Furthermore, a drive signal for inverting the polarity of the liquid crystal is supplied to the polarity voltage lines POLA and POLB in units of one block.

It should be noted that an operation for dividing the polarity voltage lines POLA and POLB into blocks and an operation for supplying a drive signal to each of blocks of polarity voltage lines POLA and POLE are controlled by the vertical drivers 221A and 221B and the V address latches 222A and 222B on the basis of an instruction given from the driver IC 3. That is, the driver IC 3, the vertical drivers 221A and 221B and the V address latches 222A and 222B form a control unit.

FIG. 11 is a timing chart for explaining a polarity inversion scheme of the liquid crystal display device according to the first embodiment.

A voltage to be applied to the common voltage line VCOM electrically connected to the counter-electrode CE is a constant direct-current voltage (5V in this case). Also, as described above, a constant direct-current voltage (5V in this case) is applied to each of polarity voltage lines POLB belonging to the blocks. Therefore, a voltage to be applied to each of the polarity voltage lines POLA is repeatedly inverted.

At time Ts1, the voltage applied to polarity voltage lines POLA belonging to block POLA_01 vary from 0 to 10V. Then, after a lapse of Δt time, the voltage applied to polarity voltage lines POLA belonging to block POLA_02 vary from 0 to 10V. Thereafter, in subsequent blocks also, the above voltage variation from 0 to 10V occurs in the polarity voltage lines POLA belonging to the subsequent blocks successively at intervals of a predeterminate time period.

At time Te1, the voltage applied to the polarity voltage lines POLA belonging to block POLA_01 vary from 10V to 0V. Thereafter, in subsequent blocks also, the above voltage variation from 10 to 0V occurs in the polarity voltage lines POLA belonging to the subsequent blocks successively at intervals of a predetermine time period.

It suffices that time Δt from time at which the polarity inversion of a given block starts to time at which the polarity inversion of a subsequent block starts is longer than or equal to time (approximately 1 to 2 microseconds) required until charge and discharge of the liquid crystal LQ which occurs because of the polarity inversion is stabilized. For example, where the repetition frequency of the polarity inversion is 60 Hz (repetition cycle 16≈ms), and the number of blocks is 16, ΔT≈1 ms, and the polarity inversion can thus be performed without causing charge and discharge of the liquid crystal LQ to occur at a time.

It should be noted that in the MIP liquid crystal display device, a polarity inversion operation and a signal writing operation to a memory can be performed independent of each other. Therefore, time for which the polarity inversion of a single block continues (in the example illustrated in FIG. 11, for example, time T from time ts1 to time te1) can be set to arbitrary proper time. Also, cycles in which the polarity inversion operation is performed does not need to be made to coincide with cycles of a frame period.

FIG. 12 is a view illustrating the configuration of polarity voltage lines which was studied before conceiving of the liquid crystal display device according to the first embodiment. FIG. 13 is a timing chart for illustrating a polarity inversion scheme which was studied before conceiving the liquid crystal display device according to the first embodiment.

A method in which the voltages of all the polarity voltage lines POLA are inverted at a time as illustrated with reference to FIGS. 12 and 13 has the following problems: as charge and discharge of the liquid crystal LQ occur at the same time when the polarity inversion is performed, the power consumption is increased due to a voltage variation, and the display quality is lowered since polarity inversion occurs in the entire liquid crystal LQ at a time.

By contrast, in the liquid crystal display device according to the first embodiment, of the polarity voltage lines POLA and POLB, at least polarity voltage lines in which polarity inversion is to be performed are divided into a plurality of blocks. Each of the blocks includes a plurality of polarity voltage lines successively arranged in the column direction. Then, these blocks are successively given a polarity inversion signal at regular intervals such that the polarity inversion signal is supplied to the polarity voltage lines of each of the blocks. According to this method, the polarity inversion operation is performed in units of one block, thus restricting an increase in the power consumption due to a voltage variation occurring when the polarity inversion is performed, and also restricting lowering of the display quality, which is caused by the polarity inversion.

Second Embodiment

The second embodiment is different from the first embodiment regarding how to divide polarity voltage lines into blocks. In the second embodiment, elements identical to those in the first embodiment will be denoted by the same reference numbers, respectively, and their detailed explanations will be omitted.

FIG. 14 is a view for explaining the configuration of polarity voltage lines of a liquid crystal display device according to the second embodiment. It should be noted that the timing of the polarity inversion in the liquid crystal display device according to the second embodiment is the same as that of the polarity inversion in the liquid crystal display device according to the first embodiment as illustrated in the timing chart of FIG. 11.

In the second embodiment, of polarity voltage lines POLA and POLB, polarity voltage lines in which polarity inversion is to be performed are divided into a plurality of blocks each including at least two polarity voltage lines. To be more specific, each of the blocks includes a plurality of polarity voltage lines arranged every L (L: an integer of two or more) rows in the column direction. Then, the blocks are successively given a polarity inversion signal at regular intervals such that the polarity inversion signal is supplied to the polarity voltage lines of each of the blocks. According to this method, the polarity inversion operation is performed in units of one block, thus restricting an increase in the power consumption due to a voltage variation occurring when the polarity inversion is performed, and also restricting lowering of the display quality, which is caused by the polarity inversion. Furthermore, since a polarity inversion signal is supplied to polarity voltage lines arranged every L rows, the influence of the polarity inversion on the display is dispersed, so that flicker is not easily visually recognized.

Third Embodiment

The third embodiment is different from the first embodiment regarding how to divide polarity voltage lines into blocks. In the third embodiment, elements identical to those in the first embodiment will be denoted by the same reference numbers, respectively, and their detailed explanations will be omitted.

As described above, in the MIP liquid crystal display device, a polarity inversion operation can be performed independent of a signal writing operation on a liquid crystal LQ. Furthermore, the order and cycles in which polarity voltage lines are subjected to the polarity inversion can be arbitrarily set. Therefore, in the liquid crystal display device according to the third embodiment, of the polarity voltage lines POLA and POLB, at least two or more polarity voltage lines in which polarity inversion is to be performed are divided into a plurality of blocks. Each of the blocks includes a plurality of polarity voltage lines. Then, the blocks are successively given a polarity inversion signal at regular intervals such that the polarity inversion signal is supplied to the polarity voltage lines of each of the blocks. According to this method, the polarity inversion operation is performed in units of one block, thus restricting an increase in the power consumption due to a voltage variation occurring when the polarity inversion is performed, and also restricting lowering of the display quality, which is caused by the polarity inversion.

All displays which a person with ordinary skill in the art can put to practical use by appropriately changing the designs of the displays described above with respect to the embodiments fall within the scope of the present invention, as long as they cover the spirit of the present invention.

A person with ordinary skill in the art could conceive various changes and modifications of the present invention within the scope of the technical concept of the invention, and naturally, such changes and modifications are encompassed by the scope of the present invention. For example, if a person with ordinary skill in the art adds/deletes/alters a structural element or design to/from/in the above-described embodiments, or adds/deletes/alters a step or a condition to/from/in the above-described embodiment, as long as they fall within the scope and spirit of the present invention, such addition, deletion, and altercation are encompassed by the scope of the present invention.

Furthermore, regarding the present embodiments, any advantage and effect those will be obvious from the description of the specification or arbitrarily conceived by a skilled person are naturally considered achievable by the present invention.

Various inventions can be achieved by any suitable combination of a plurality of structural elements disclosed with respect to the above embodiments. For example, some structural elements may be deleted from the whole structural elements described with respect to the embodiments. Furthermore, some structural elements of one embodiment may be combined with other structural elements of another embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display device comprising:
    pixel electrodes arranged in a matrix and each including unit pixel electrodes;
    pixel circuits which apply a white-display voltage or a black-display voltage to the unit pixel electrodes, respectively;
    first and second polarity voltage lines arranged parallel to each other and extending along a row in which the pixel electrodes are arranged, the first and second polarity voltage lines being used in applying the white-display voltage and the black-display voltage to the pixel circuits; and
    a control unit which divides at least polarity voltage lines to be subjected to polarity inversion driving, that are included in the first and second polarity voltage lines, into a plurality of blocks for every L rows (L being an integer of 2 or greater) by wiring lines extending along a column in which the pixel electrodes are arranged, and supplies a polarity inversion signal to the polarity voltage lines to be subjected to polarity inversion driving, in units of one block,
    wherein the pixel circuits each include:
        a pixel switch which permits a binary image signal to pass through the pixel switch or inhibits the binary image signal from passing through the pixel switch;
        a memory which receives the binary image from the pixel switch and holds the binary image signal; and
        a polarity select unit which selects a voltage signal on one of the first and second polarity voltage lines in response to the binary image signal held by the memory, and
    the memory comprises:
        an inverter which inverts a polarity of the binary image signal from the pixel switch; and
        a clocked inverter having two channels, which further inverts a polarity of a signal which has been inverted, and feeds the signal back to an input side of the inverter.

2. The liquid crystal display device according to claim 1, wherein each of the blocks includes the polarity voltage lines to be subjected to polarity inversion driving, and the polarity voltage lines to be subjected to polarity inversion driving are successively arranged parallel to each other and are successively selected in a column direction.

3. The liquid crystal display device according to claim 2, further comprising square pixels each comprising red (R), green (G), blue (B) and achromatic (W) sub-pixels.

4. The liquid crystal display device according to claim 3, the liquid crystal display device being a reflective liquid crystal display device, wherein silver (Ag) is provided on reflection surfaces of the pixel electrodes.

5. The liquid crystal display device according to claim 1, wherein each of the blocks includes the polarity voltage lines to be subjected to polarity inversion driving, and the polarity voltage lines to be subjected to polarity inversion driving are arranged parallel to each other and are selected every L (an integer of two or more) rows in a column direction.

6. The liquid crystal display device according to claim 5, further comprising square pixels each comprising red (R), green (G), blue (B) and achromatic (W) sub-pixels.

7. The liquid crystal display device according to claim 6, the liquid crystal display device being a reflective liquid crystal display device, wherein silver (Ag) is provided on reflection surfaces of the pixel electrodes.

8. The liquid crystal display device according to claim 1, further comprising square pixels each comprising red (R), green (G), blue (B) and achromatic (W) sub-pixels.

9. The liquid crystal display device according to claim 8, the liquid crystal display device being a reflective liquid crystal display device, wherein silver (Ag) is provided on reflection surfaces of the pixel electrodes.

10. A liquid-crystal display method of a liquid crystal display device which comprises:
    pixel electrodes arranged in a matrix and each including unit pixel electrodes;
    pixel circuits which apply a white-display voltage or a black-display voltage to the unit pixel electrodes, respectively, to cause the unit pixel electrodes to make a display with a gradation according to an area gradation method; and
    first and second polarity voltage lines arranged parallel to each other and extending along a row in which the pixel electrodes are arranged, the first and second polarity voltage lines being used in applying the white-display voltage and the black-display voltage to the pixel circuits,
    wherein the pixel circuits each include:
        a pixel switch which permits a binary image signal to pass through the pixel switch or inhibits the binary image signal from passing through the pixel switch;
        a memory which receives the binary image from the pixel switch and holds the binary image signal, said memory including an inverter and a clocked inverter having two channels; and
        a polarity select unit which selects a voltage signal on one of the first and second polarity voltage lines in response to the binary image signal held by the memory,
    the liquid-crystal display method comprising:
    dividing at least polarity voltage lines to be subjected to polarity inversion driving, that are included in the first and second polarity voltage lines, into a plurality of blocks for every L rows (L being an integer of 2 or greater) by wiring lines extending along a column in which the pixel electrodes are arranged; and
    supplying a polarity inversion signal to the polarity voltage lines to be subjected to polarity inversion driving, in units of one block,
    said method further comprising,
    inverting, using said inverter of said memory, a polarity of the binary image signal from the pixel switch, and
    inverting, using the clocked inverter having two channels of said memory, a polarity of a signal which has been inverted, and feeding the signal back to an input side of the inverter.

11. The liquid-crystal display method according to claim 10, wherein each of the blocks includes the polarity voltage lines to be subjected to polarity inversion driving, and the polarity voltage lines to be subjected to polarity inversion driving are successively arranged parallel to each other and are successively selected in a column direction.

12. The liquid-crystal display method according to claim 10, wherein each of the blocks includes the polarity voltage lines to be subjected to polarity inversion driving, and the polarity voltage lines to be subjected to polarity inversion driving are arranged parallel to each other and are selected every L (an integer of two or more) rows in a column direction.

* * * * *